United States Patent Office 3,223,890
Patented Dec. 14, 1965

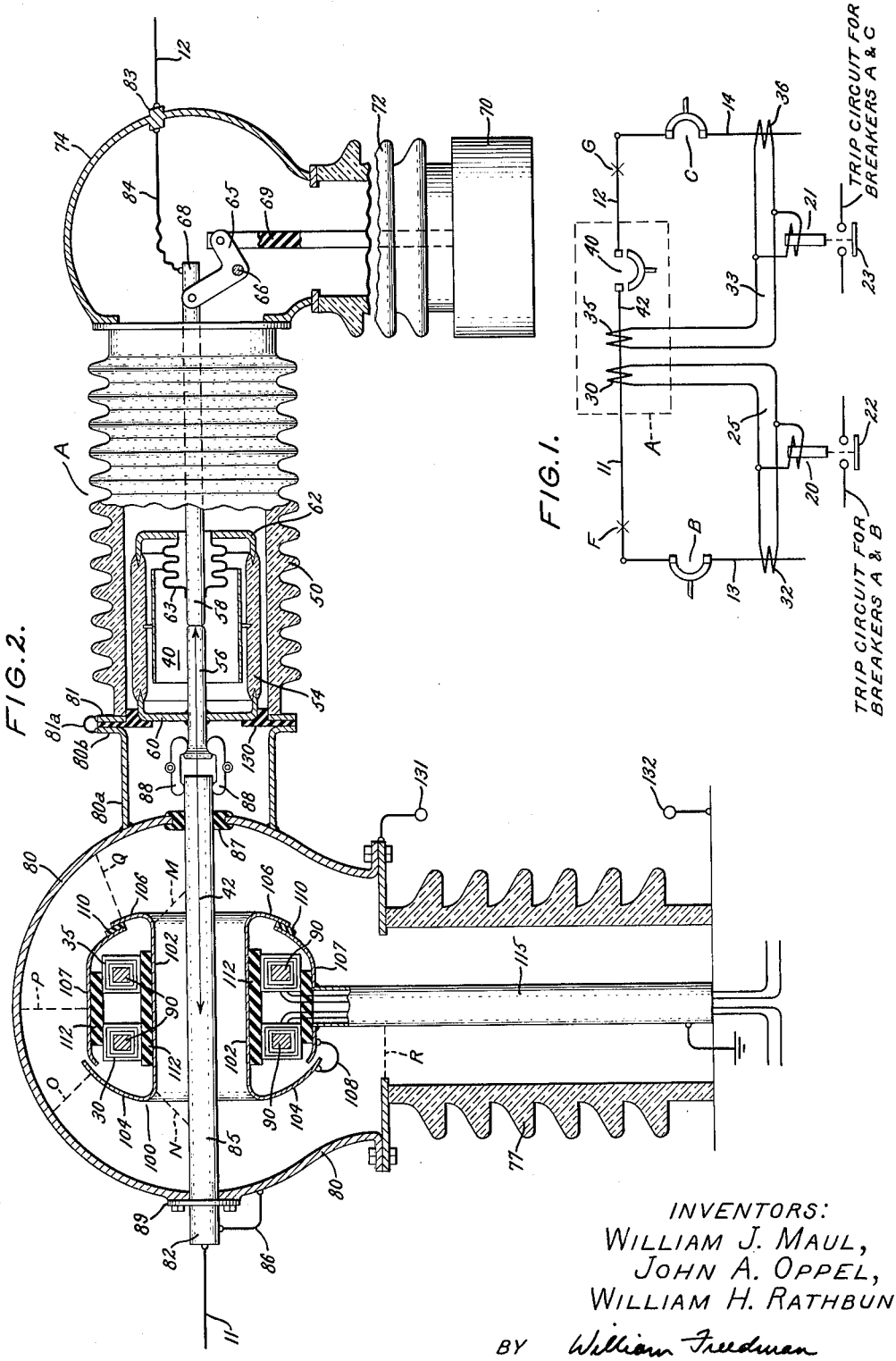

3,223,890
ELECTRIC PROTECTIVE EQUIPMENT
William J. Maul, Mount Ephraim, N.J., John A. Oppel, Aldan, Pa., and William H. Rathbun, Riverton, N.J., assignors to General Electric Company, a corporation of New York
Filed Sept. 30, 1963, Ser. No. 312,444
12 Claims. (Cl. 317—15)

This invention relates to protective equipment for electric power circuits and, more particularly, relates to a current transformer arrangement for circuit breaker relaying purposes. The invention is particularly concerned with a current transformer arrangement that comprises secondary windings located at one electrical side only of the circuit interrupting part of a circuit breaker.

The usual electric power system may be thought of as comprising a number of system portions interconnected by circuit breakers between adjacent portions. These circuit breakers are usually controlled by a protective relay system which must be capable of sensing the occurrence of a fault in any of the system portions and of initiating opening of those particular circuit breakers which are located to effect isolation of the affected system portion from the remainder of the system. It is a general objective in the art of protective relying to open only the minimum number of circuit breakers required to effect isolation of the fault so that a maximum amount of the system remains available for continued uninterrupted service.

To this end, the protective relaying system usually comprises a plurality of relays, each of which has its zone of operation generally coextensive with a different one of the system portions. Each of these relays can determine when a fault occurs in its own particular zone of operation and can respond by initiating opening of the breakers at opposite terminals of its zone.

A conventional manner of establishing the physical boundries of an operating or protective zone is to locate current transformer windings at the locations one wishes to consider the boundaries of the zone and to connect these windings in a differential protective circuit. A relay suitably connected in such a differential circuit will operate in response to a fault occurring inside this protective zone but will remain inactive if the fault is external to this zone.

The two current transformer windings that define the adjacent boundaries of adjacent operating zones are usually mounted at the terminals of the circuit breaker that interconnects the two zones, e.g., a tie breaker. In certain types of circuit breakers, it is desirable for various reasons to locate these two current transformer windings at one electrical side only of the circuit interrupting part of the tie breaker. The problem that arises when the current transformer windings are so located is that the power circuit contains what will be called an ambiguous portion extending between the current transformer location and the circuit interrupting part of the tie breaker. In conventional prior arrangements, faults occurring from this ambiguous portion would be erroneously interpreted by the relaying system. For example, assuming the current transformer windings are located on the left hand side of the circuit interrupting part of the tie breaker, this ambiguous portion of the power circuit would be located on the left hand side of the circuit interrupter but in the operating zone of the relay that controls the power system portion to the right of the circuit interrupter. A fault from the ambiguous portion of the power circuit will tend to cause this latter relay to open the tie breaker and the circuit breakers to its right, but the fault can be cleared only by opening the tie breaker and the circuit breakers to its left. This is one of the problems that the present invention is concerned with.

Accordingly, an object of the present invention is to construct a current transformer assembly, which is of the type that has both secondary windings located at one side only of the circuit interrupter of a circuit breaker assembly, in such a manner that the secondary windings can correctly respond to faults that occur in the ambiguous portion of the power circuit described hereinabove.

Another object is to construct a current transformer assembly capable of performing in the manner set forth in the immediately preceding paragraph and also capable of correctly responding to faults located in various other locations in and adjacent to the current transformer assembly.

In some types of relaying systems, the function of the two current transformer secondary windings can be performed by only a single secondary winding replacing the two secondary windings and located where the two secondary windings were located. Another object is to construct a current transformer assembly of this latter type in such a manner that the single secondary winding can correctly respond to faults that occur in the ambiguous portion of the power circuit described hereinabove and in various other locations in and adjacent the current transformer assembly.

In practicing our invention, we encompass the secondary windings of the current transformer assembly with metal shielding that is at ground potential, and we locate the shielded secondary windings in a metal housing that is at the same potential as the primary conductor. This housing also surrounds the above-described ambiguous portion of the power circuit, but is electrically connected to the power circuit only at the electrical side of the current transformer assembly opposite to the location of the circuit interrupting portion of the circuit breaker. One of the purposes of this metal housing is to prevent faults from occurring between the ambiguous portion of the power circuit and points at low voltage located outside of the high potential metal housing.

Another object of our invention is to assure that faults that might possibly occur between the high potential metal housing and the grounded shielding about the current transformer secondary windings will produce a correct response of the secondary windings.

In carrying out our invention in one form, we provide a current transformer assembly that comprises a metal housing at high potential and insulating means supporting this housing and insulating it from ground. A primary conductor extends through the metal housing, and a pair of secondary windings are mounted within the housing about the primary conductor adjacent each other along the length of the primary conductor. These secondary windings are electrically spaced from the primary conductor. Means is provided for electrically connecting the primary conductor to the housing at one electrical side only of the secondary windings and for electrically insulating the housing and the primary conductor from each other except for said connection at said one electrical side. Conductive shielding is provided about the secondary windings that comprises a first conductive tube interposed between the primary conductor and the secondary windings and electrically spaced from the primary conductor, a second conductive tube disposed about the secondary windings, and means electrically connecting these conductive tubes together at said one electrical side only of the secondary windings. Conductive means provides a conductive path from this shielding to ground that is located at said one electrical side of the secondary windings. Insulating means is provided for forcing substantially all current flowing from such shielding to ground to follow said conductive path at said one electrical side of the secondary windings. This insulating means comprises means insulating the conductive tubes from each other except for the connection between the tubes at said one electrical side of the secondary windings.

When this current transformer assembly is made a part of a circuit breaker assembly, the primary conductor is electrically connected to the interrupting unit of the circuit breaker assembly, and the connection between the primary conductor and the metal housing is located on the side of the secondary windings that is opposite to the location of the connection between the primary conductor and the interrupting unit.

For a better understanding of our invention, reference may be had to the following description taken in conjunction with the accompanying drawings, wherein:

FIG. 1 is a schematic view of a power system embodying protective equipment of the type that our invention is concerned with, and FIG. 2 is a cross sectional view of a circuit breaker assembly usable in the power system of FIG. 1 and embodying one form of our invention.

Referring now to the schematic illustration of FIG. 1, there is shown, by means of a dotted line block, a circuit breaker assembly A which, for illustrative purposes, is used as a tie breaker which electrically interconnects a pair of bus sections 11 and 12. In the usual electric power system, a plurality of electric circuits, which may be either feeder or distribution circuits for respectively supplying electric energy to or from the bus are connected to each bus sections. But for simplicity, we have shown only a single circuit 13 connected to bus section 11 and a single circuit 14 connected to bus section 12. Circuit 13 is interconnected to bus section 11 through a remote circuit breaker B, and circuit 14 is interconnected to the bus section 12 through a remote circuit breaker C. For the purposes of this description, these remote circuit breakers may be of a conventional construction, and hence, are shown in schematic form only.

It is desirable to isolate, or deenergize, only the faulty portion of the electrical power system upon the occurrence of a fault condition in order to permit uninterrupted service to be maintained over the remainder of the system. To this end, if a fault should occur in an external portion of the circuit extending between the breakers, only the breakers at the terminals of the faulted external circuit portions should open. For example, should a fault occur at F in FIG. 1, it would be necessary to open only the breakers A and B whereas breaker C should desirably remain connected to its bus section. Thus, circuit 14, if a feeder circuit, could continue to supply power through bus section 12 to any other circuit (not shown) suitably connected to bus section 12. Such other circuit would ordinarily be connected to bus section 12 through a circuit breaker (not shown) controlled by a suitable current transformer winding connected into the hereinafter described protective circuit 33 in a conventional manner, such as is disclosed in U.S. Patent 2,804,576, Coggeshall et al., assigned to the assignee of the present invention. In a corresponding manner, if a fault should occur at G instead of F, it would be necessary to open only breakers A and C, whereas breaker B should remain operatively connected to its bus station 11, whereby to permit this bus section to remain energized.

To control the circuit breakers of FIG. 1 in the manner described above, differential relays 20 and 21 are provided. Differential relay 20 includes normally open contacts 22 which, when closed, establish a tripping circuit for breakers A and B. Differential relay 21 includes normally open contacts 23 which, when closed, establish a tripping circuit for breakers A and C. To those skilled in the art, it will be obvious that each of the circuit breakers controlled by a particular tripping circuit may have an electrically controlled trip latch which is releasable to effect breaker opening in response to current flow through its particular trip circuit. Accordingly, for the purposes of simplifying this description, the conventional details of the tripping circuit have been omitted.

Energization and operation of the relay 20 is effected from a differential protective circuit 25 including a current transformer secondary winding 30 of the breaker A and a current transformer secondary winding 32 of the breaker B. Each of these secondary windings 30 and 32 is energized in accordance with the value of current flowing in the portion of the primary conductor about which each secondary is disposed. As is well known in the art, the secondary windings are connected in such a manner that when these primary current values are vectorially equal, current merely circulates between the windings 30 and 32 of the protective circuit 25, as a result of which the coil of relay 20 receives no effective current and remains deenergized. However, if these primary current values become unequal by a vector difference exceeding a predetermined amount, sufficient current will flow through the coil of a relay 20 to operate the relay, thereby to close its contacts 22 and establish a trip circuit for breakers A and B. This equal primary current condition will exist so long as no fault is present in the zone of the power circuit extending between windings 30 and 32. However, should a fault, such as at F, occur in this zone, the current flowing into the zone through one of the primary conductor portions would no longer be vectorially equal to the current flowing out of the zone through the other primary conductor portion. The resulting vector difference would produce a current flow in the differential protective circuit 25 which would be such as to operate differential relay 20 so as to effect tripping of breakers A and B. Thus, the differential relay 20 will operate in response to any fault occurring within the protective zone of the power circuit extending between the windings 30 and 32. Differential protective circuits of this general kind are well known, and may include either a direct connection between the current transformer windings, as is shown, or may alternatively include pilot wires or some other conventional signalling channel interconnecting the windings.

Similarly, energization of the other differential relay 21 is effected from a differential protective circuit 33 including the current transformer windings 35 and 36, associated with breakers A and C, respectively. The winding of relay 21 is connected in its protective circuit in the same manner as described with respect to relay 20, so that should a fault occur in the protected zone of the power circuit extending between windings 35 and 36, such as at G, the relay 21 would operate to close and thereby trip breakers A and C.

It will be noted from FIG. 1 that the current transformer secondary windings 30 and 35 associated with the circuit breaker A are located at one electrical side only of the interrupting portion 40 of the circuit breaker A. This location at one side of the interrupter 40 is advantageous in that it permits the current transformer assembly to be of a relatively inexpensive construction, but there are certain problems that are presented by this location. One of these problems is that most conventional protective systems cannot correctly sense a fault which might occur in the portion 42 of the power circuit extending between the current transformer windings 30, 35 and the interrupter 40 of the circuit breaker. More specifically, it will be noted in FIG. 1 that although this portion 42 of the power circuit is electrically located on the left hand side of the interrupter 40, it appears to be located in the operating zone of the relay 21 that controls the power system portion to the right of the interrupter 40. Being located in the operating zone of the right hand relay 21, a fault from power circuit portion 42 will tend to cause relay 21 to operate to open breakers A and C. But this would not clear the fault since it is actually between breakers A and B and can be cleared only by opening breakers A and B. Overcoming this problem is one of our basic objects. The manner in which this problem has been overcome will appear more clearly from the following description of the breaker A and its current transformer assembly.

Referring to FIG. 2, this circuit breaker A comprises a horizontally disposed porcelain cylinder 50 that houses the interrupting units of the circuit breaker. These interrupting units can be of any suitable conventional design, but we prefer to use vacuum-type circuit interrupters, such as shown for example in U.S. Patent No. 2,949,520 Schneider, assigned to the assignee of the present invention. One of these interrupting units is shown at 40 in FIG. 2. This interrupting unit comprises a highly evacuated housing 54 and a pair of separable contacts 56 and 58 within the housing. Contact 56 is a stationary rod contact, and contact 58 is a movable rod contact that is longitudinally movable into and out of engagement with stationary contact 56. The evacuated housing 54 comprises an end plate 60 that is suitably joined to the stationary rod contact 56 and an end plate 62 through which the movable contact 58 is freely movable. A suitable flexible bellows 63 is disposed between the end plate 62 and the movable contact 58 to permit longitudinal movement of the contact 58 without impairing the vacuum inside of housing 54.

Preferably, a plurality of interrupting units such as 40 are located within the housing 50 and are electrically connected together in series circuit relationship (in a conventional manner, not shown). The movable contacts of these units are simultaneously operated by a common actuating linkage comprising a bell crank 65 at the right hand end of the porcelain cylinder 50. This bell crank is pivotally mounted on a stationary pivot 66 and has its driven end pivotally connected to a longitudinally movable contact actuating member 68. The connection between actuating member 68 and the movable contact 58 of the breaker may be conventional and is shown only schematically. The other end of the bell crank 65 is connected to a vertically movable operating rod 69. This operating rod 69 is of a suitable insulating material and connects the bell crank 65 to an operating mechanism (not shown) in a metallic enclosure 70 at ground potential.

For supporting the right hand end of the porcelain cylinder 50 that houses the interrupting units 40 we provide a vertically extending porcelain column 72. Atop this column 72 is a metal housing 74 that surrounds the bell crank 65 in spaced-apart relationship and is suitably secured to both the horizontally-extending porcelain cylinder 50 and the vertically extending column 72.

For supporting the left hand end of the horizontally-extending porcelain cylinder 50, we provide another vertically-extending porcelain column 77. Mounted atop this column 77 is a metallic housing 80 that is suitably secured to both the vertically-extending column 77 and the horizontally-extending cylinder 50. The current transformer secondary windings 30, 35 of the circuit breaker A are mounted inside this housing 80 in spaced-apart relationship to the housing 80. It will be noted that the housing 80 has a horizontally extending tubular extension 80a with a flange 80b that is bolted to a flange 81 at the left hand end of the porcelain cylinder 50. The flanges 80b and 81 are electrically connected together, as schematically indicated by the connection 81a.

The circuit breaker A has a terminal 82 at its left hand side to which the bus section 11 is electrically connected and a terminal 83 at its right hand side to which the bus section 12 is electrically connected. When the circuit breaker is closed, current flows between these terminals via the interrupting unit 40. For carrying current between the right hand terminal 83 and the interrupting unit 40, a suitable conductor 84 is electrically connected between the terminal 83 and the conductive actuating rod 68. This latter rod is electrically connected to the movable contact 58.

For carrying current between the left hand terminal 82 of the circuit breaker and the interrupter 40, a straight conductive stud 85 is provided. This conductive stud extends through the window of the current transformer secondary windings 30, 35 and is electrically connected at its right hand end to an extension of the contact rod 56, which may be thought of as a terminal of the interrupter 40. Since the conductive stud 85 carries current through the window of the secondary windings, it serves as the primary conductor of the current transformer assembly. For reasons which will soon be pointed out in greater detail, the conductive stud 85 is electrically connected to housing 80 only on the side of the current transformer windings 30, 35 opposite to the location of the circuit interrupter 40, i.e., the left hand side of the current transformer windings as viewed in FIG. 2. This connection is schematically shown at 86. Except for this electrical connection (86) at the left hand side of the current transformer windings 30 and 35, the metal housing 80 is electrically insulated from the conductive stud 85. Insulation between the stud 85 and the housing 80 at the right hand side of secondary windings 30, 35 is shown at 87.

The connection between the right hand end of the conductive stud 85 and the contact rod 56 is preferably made through a set of finger contacts 88 that are supported on the rod contact 56 and are suitably spring-pressed into engagement with these two aligned parts 56 and 85. For maintaining the conductive stud 85 in its position of FIG. 2, it is provided with an integral flange 89 at its left hand end that is bolted to the metal housing 80.

Each of the current transformer secondary windings 30 and 35 is of a conventional design and, as such, is wound about its own annular magnetic core 90, which encompasses the primary conductor 85. The turns of each of these windings are electrically insulated from each other and from the core in a conventional manner. The cores 90 are at ground potential, as is one point on each of the secondary windings. The space located internally of the magnetic core 90 is referred to herein as the window of the current transformer secondary.

These windings 30 and 35 are enclosed by grounded metallic shielding 100 that serves a number of different functions. One of these functions is to electrostatically shield the windings by preventing concentrations of electrical stress adjacent the irregular surfaces thereof. Another important function of the shielding 100 is to assure a correct response by the current transformer windings 30 and 35 in case of a flashover between the adjacent high voltage parts and the grounded parts of the current transformer assembly. In this respect, the shielding directs fault current resulting from such a flashover to ground by a path that is located to produce a correct response of the current transformer windings. This will be explained in more detail hereinafter.

The metallic shielding 100 comprises a tubular inner portion 102 that is located internally of the secondary windings 30 and 35 and is interposed between the primary conductor 85 and the secondary windings. Radially outwardly extending annular flanges 104 and 106 integral with the tubular inner portion 102 are provided at opposite ends of the tubular inner portion 102 and at opposite sides of the windings 30 and 35. Located radially outward of the windings 30 and 35 is a tubular outer portion 107 that is electrically connected to the left hand flange 104 by a conductor 108. The tubular outer portion 107 is spaced from the right hand flange 106 by an insulating gap 110 extending about the entire periphery of the outer part 107 and is electrically insulated from the right hand flange except for the connection at 108 to the left hand flange. In effect, the shielding 100 is of a generally toroidal form and provides a conductive path extending completely about the secondary windings 30 and 35 except for the discontinuity provided by the insulating gap 110.

The shielding 100 and the windings 30 and 35 are at substantially ground potential, but suitable electrical insulation is provided between them to maintain electrical isolation between secondary winding circuits and any circuit through the conductive shielding 100. Such insulation is shown at 112 in FIG. 2.

For supporting the secondary windings 30, 35 and the shielding 100, we provide a hollow conductive pedestal 115 that extends through the insulating column 77. The top of this pedestal 115 is electrically and mechanically connected to shielding 100, and the bottom of the pedestal is connected to suitable grounded structure. The hollow pedestal 115 forms a conduit through which the leads of the secondary windings 30 and 35 extend.

For insulating the grounded structure 110, 115 from the primary conductor 85 and the housing 80, both of which are at high potential, a suitable gaseous insulation, such as sulfur hexafluoride, is provided within the housing 80. Since the grounded structure 100, 115 is spaced from the high potential parts, the gaseous insulation provides the necessary dielectric strength between these parts to normally prevent electrical breakdowns, or flashovers, inside the housing 80.

As was explained hereinabove, the relay system of FIG. 1 has a problem with correctly sensing faults that occur from the ambiguous portion 42 of the power circuit that extends between the windings 30, 35 and the interrupter 40. This portion of the power circuit has also been designated 42 in FIG. 2 and constitutes the right hand end of the conductive stud 85 and the contact rod 56 of the circuit interrupter. As explained hereinabove, a fault to ground from this portion 42 of the power circuit should properly be relayed as a fault located to the left of the interrupting unit 40 even if the fault is in the apparent operating zone of the relay 21 controlling the circuit breaker to the right of the tie breaker A.

As one step in attaining this objective, we handle faults in this ambiguious portion 42 of the power circuit by forcing any fault that does occur from portion 42 to be directed to the shielding structure 100 located within the confines of the high voltage housing 80. For all practical purposes, we prevent the occurrence of faults between 42 and points outside the housing 80. The possibility of a fault between portion 42 and a point outside the housing 80 is made virtually nil by the fact that housing 80, which is at the same potential as portion 42, surrounds all of the otherwise exposed parts of the circuit portion 42. Thus, the housing 80 is interposed in all potential breakdown paths between the circuit portion 42 and low voltage points outside the housing 80; and faults in this vicinity, if they do occur, will be from the housing 80 rather than the power circuit portion 42. Since the housing 80 is electrically connected to the primary conductor 85 only at the left hand side of the current transformer windings 30, 35, these faults from housing 80 to external points will appear to the relaying system as faults located in the zone of the relay 20 controlling the left hand portion of the power circuit. This is a correct interpretation of the fault location, since such faults are actually to the left of the interrupter 40 and can ordinarily be cleared by opening breakers A and B of FIG. 1.

In arranging the housing 80 so that is provides the above-described shielding of the portion 42 of the primary circuit from flashovers to points external to the housing 80, it is important that all of the metals susceptible to such external faults be electrically isolated from the power circuit portion 42 except for the connection (86) at the left hand side of the windings 30, 35. Thus, the tubular extension 80a of housing 80 and the flanges 80b and 81 at the left hand end of porcelain housing 50 are locally insulated from the primary conductor 85 except for the connection at 86. This local insulation is primarily obtained by spacing the exposed external metal from the power circuit portion 42, but a ring 130 of solid insulation aids in this respect at the outer periphery of the end plate 60 of the interrupter.

Although the presence of housing 80 substantially prevents flashovers between power circuit portion 42 and points external to the housing 80, there is still a possibility of faults to the grounded structure located inside housing 80. The only grounded structure inside housing 80 that is exposed to such faults is the grounded shielding 100 and its supporting pedestal 115. We have constructed this shielding 100 and its support in such a manner that any faults thereto from the power circuit portion 42 will be directed to ground via a path that produces a correct response of the windings 30, 35. In this respect, any fault between the power circuit portion 42 and the shielding 100 will be either to the inner tubular portion 102 of the shielding or to the right hand flange 106, such as is shown at M. Current flowing through the shielding 100 to ground from this flashover at M must flow through the window of the current transformer windings 30 and 35 via the tubular inner portion 102. It will then flow through flange 104 and in parts 108, 107 and 115 to ground. The presence of the discontinuity at 110 prevents such current from following a path radially-outward through the flange 106 to the tubular outer portion 107.

To illustrate that the above-described routing of the current to ground from M will produce a correct response by the current transformer windings, assume first that all of the current is flowing into the fault from the left hand side of the circuit breaker. The current that flows to the right through conductor 85 will in effect be cancelled out by this same current flowing to the left through tubular shielding portion 102. Thus, windings 30 and 35 will receive zero fault current. Referring to FIG. 1 since the remote winding 32 receives full fault current and winding 30 receives zero fault current, it will be apparent that the left hand relay 20 will operate, as is desired. Since winding 35 and the remote winding 36 both receive zero fault current, relay 21 will remain inactive, as is desired.

Assume next that current is flowing into flashover M from the right hand side of the breaker. This current will flow through the windows of both windings 30 and 35 via the tubular part 102 and then will flow through parts 104, 108, 107 and 115 to ground. Thus, both windings 30 and 35 will receive full fault current under these circumstances. Since the left hand remote winding 32 receives zero fault current while winding 30 is receiving full fault current, left hand relay 20 will respond by operating as is desired. Since the remote right hand winding 36 and winding 35 both receive full fault current, right hand relay 21 will remain inactive, as is desired.

A fault to the left of the current transformer windings 30, 35 as shown for example at N will produce the same response by the windings as the fault at M. In this respect, if current is being fed into the fault N from the left, the current through the fault will follow a path through parts 104, 108, 107 and 115 to ground. This will result in windings 30 and 35 receiving zero fault current. Since the remote left hand winding will receive full fault current while winding 30 receives zero fault current, the left hand relay 20 will operate, as is desired. Since the remote right hand winding 36 as well as winding 35 receives zero fault current, the right hand relay 21 will remain inactive, as is desired.

If the current is assumed to be fed into flashover N from the right, it will flow first through the window of the current transformer windings 35, 30 via conductor 85 then through the flashover N and the parts 104, 108, 107 and 115 to ground. This will result in the two windings 35, 30 receiving full fault current. Since the right hand remote winding 36 also receives full fault current, the right hand relay 21 will remain inactive, as is desired.

Since the remote left hand winding 32 receives zero fault current while the winding 30 receives full fault current, the left hand relay 20 will operate, as is desired.

Next assume a fault at O between the housing 80 and the flange 104 of the grounded shielding 100. Current through the shielding 100 from this fault at O will follow essentially the same path as pointed out relative to the fault at N, i.e., through the parts 104, 108, 107 and 115 to ground. Thus, for fault current flowing into fault O from the left hand side of the breaker, windings 30 and 35 will receive no fault current. This will produce operation of the left hand relay 20 but not the right hand relay 21.

Current flowing through fault O from the right hand side of the circuit breaker A would pass through the windows of windings 35 and 30 via conductor 85 and then through connection 86 and housing 80, the fault O and parts 104, 108, 107 and 115 to ground. This would cause windings 30 and 35 to receive full fault current. The right hand remote winding 36 will also receive full fault current, causing right hand relay 21 to remain inactive, as is desired. Remote winding 32 would receive zero fault current while winding 30 receives full fault current, causing left hand relay 21 to operate, as is desired.

A fault at R (i.e., between the housing 80 and the pedestal 115) would cause the current transformer windings 30, 35 and the relays 20 and 21 to respond in the same manner as described above for a fault at O.

A fault at P (i.e., between the metal housing 80 and the outer portion 107 of the shielding 100) would also produce the same response from the current transformer windings and the relay system as a fault at O.

Assume next that a fault occurred at Q, i.e., between the housing 80 and the flange 106 of the shielding 100. Current from the right hand side of the breaker A would flow through fault Q to ground via a path extending leftwardly through conductor 85, and then through connection 86, the fault Q, flange 106, leftwardly through tubular part 102 and then through parts 104, 108, 107 and 115 to ground. This would result in windings 30 and 35 receiving twice full fault current. Since the left hand remote winding 32 receives zero fault current while winding 30 is receiving twice full fault current, the left hand relay will operate, as is desired. The right hand remote winding 36 receives full fault current while the winding 35 is receiving twice full fault current. This, however, will not normally cause the right hand relay 21 to operate because both of these current transformers will be saturated by full fault current resulting from the close-in fault at Q, and the second passage of current through the window of winding 35 merely further saturates this current transformer, producing little increase in its output voltage. Thus the output voltages from windings 35 and 36 are about equal under the assumed conditions, and the right hand relay remains inactive.

Current fed from the left hand side of the breaker A through fault Q would follow a path through housing 80, fault Q, leftwardly through 102, then through 104, 108, 107 and 115 to ground. This would cause windings 30 and 35 to receive full fault current. The remote left hand winding 32 also receives full fault current, but such current is flowing in an opposite direction to that flowing through winding 30, and this would result in the left hand relay 20 operating, as is desired. Since the right hand remote winding 36 receives zero fault current while winding 35 is receiving full fault current, the right hand relay 21 will operate in response to the fault at Q.

This operation of the right hand relay 21 in response to a fault at Q fed from the left hand side of the breaker A would ordinarily be an unnecessary operation of the relay 21, but since the possibility of a fault at Q is very remote, this unnecessary operation can ordinarily be tolerated. The possibility of a fault occurring at Q is made even more remote by the fact that the flange 106 constitutes only a very small portion of the periphery of the shielding, thus leaving only a limited area of the shielding 100 located to the right of the discontinuity 110 that is exposed to faults from the housing 80.

It is most important that no fault occur from the ambiguous portion 42 of the conductor stud 85 to the outer tubular portion 107 of the shielding since such a fault would result in a failure of the left hand relay 20 to operate. Such faults are effectively prevented in the disclosed current transformer assembly by the large spacing between power circuit portion 42 and the outer shielding portion 107 and also by the fact that the flange 106 is interposed in any fault path between the parts 42 and 107. Also the insulation at 87 isolates the adjacent portion of housing 80 from power circuit portion 42 and precludes a fault from this region of housing 80 from appearing as a fault from the power circuit portion 42.

Although particular emphasis has been directed in the above description to flashovers occurring internally of the housing 80 of the circuit breaker assembly, it should be understood that an internal flashover is a very rare occurrence. One reason for this is that we grade the circuit breaker insulation in such a manner that under normal conditions, the breakdown voltage externally of the circuit breaker is lower than the breakdown voltage internally thereof. Thus, if an excess voltage should appear on the power circuit, it will normally cause an external breakdown in preference to an internal breakdown. For example, referring to FIG. 2, we provide a pair of externally located electrodes 131 and 132 defining a gap that normally has a lower breakdown voltage than any other stressed internal gaps in the circuit breakdown. Flashovers across this externally-located gap are readily sensed by the left hand relay 20, which will respond to cause breakers A and B to open to isolate the flashover, as is desired. If for some remote reason, a fault does occur inside the circuit breaker assembly, it will be correctly handled in the manner set forth hereinabove.

Ordinarily, the only location in the circuit breaker assembly at which there is a significant possibility of an internal fault would be inside the housing 80 since this is the only location where there is grounded structure in proximity with the high voltage parts. Since, as explained hereinabove, we are able to correctly handle internal faults that occur in this location, we are able to correctly handle substantially any fault that is likely to occur internally of the circuit breaker.

A significant advantage of our current transformer assembly is in the ease with which it can be assembled and incorporated in the overall circuit breaker assembly. A first step in such an assembly operation is to mount the current transformer windings 30 and 35 within their shielding 100 and on the pedestal 115. Then, the insulating column 77, preferably without the metal housing 80, is mounted about the pedestal 115. Thereafter, the metal housing 80 without the primary conductor 85 is lowered over the windings 30, 35 and secured to the top of the porcelain column 77. The resulting subassembly is then positioned adjacent the remainder of the circuit breaker assembly, and the flanges 80b and 81 are bolted together. Thereafter, the conductive stud 85 is slipped into the central opening at the left hand side of housing 80, and the right hand end of the stud 85 is pushed through the central opening in the shielding 100 and through the insulating ring 87 into a position between the finger contacts 88. The primary conductor is maintained in this position by bolting the flange 89 on the conductor 85 to the housing 80.

In the above description, particular attention has been given to a circuit breaker that has two secondary windings located in the metal housing 80. It should be understood, however, that in some circuit breaker applications equivalent relaying can be performed with only a single secondary winding located in this housing 80. This single secondary winding can provide an output which is compared in a conventional manner with the output from both of the remote secondary windings 32 and 36 to provide an indication of a fault in either of the two protective zones described hereinabove. If this single secondary winding is surrounded by the particular metallic shielding shown at 100 in FIG. 2, it too can correctly interpret the location of faults to the left of the interrupter 40, even when they occur from the portion 42 of the power circuit. Accordingly, in its more general aspects, this invention is applicable to an arrangement that has a single secondary performing the function of the two secondaries 30 and 35.

While we have shown and described particular embodiments of our invention, it will be obvious to those skilled in the art that various changes and modifications may be made without departing from our invention in its broader aspects, and we, therefore, intend in the appended claims to cover all such changes and modifications as fall within the true spirit and scope of our invention.

What we claim as new and desire to secure by Letters Patent of the United States is:

1. A current transformer assembly comprising:
 (a) a metal housing at high potential,
 (b) insulating means supporting said housing and insulating said housing from ground,
 (c) a primary conductor extending through said metal housing,
 (d) a pair of secondary windings mounted about said primary conductor and located adjacent each other along the length of said primary conductor, said secondary windings being electrically spaced from said primary conductor,
 (e) means for electrically connecting said primary conductor to said metal housing at one electrical side only of said secondary windings,
 (f) means electrically insulating said housing and said primary conductor from each other except for said connection at said one electrical side,
 (g) conductive shielding comprising a first conductive tube interposed between said primary conductor and said secondary windings and electrically spaced from said primary conductor, a second conductive tube disposed about said secondary windings, and means electrically connecting said conductive tubes together at said one electrical side only of said secondary windings,
 (h) conductive means for providing a conductive path from said shielding to ground that is located at said one electrical side of said current transformer secondary windings,
 (i) and additional insulating means for forcing substantially all current flowing from said shielding to ground to follow said conductive path at said one electrical side of said secondary windings, said additional insulating means comprising means insulating said conductive tubes from each other except for said connection between the tubes at said one electrical side only.

2. A current transformer assembly comprising:
 (a) a metal housing at high potential,
 (b) insulating means supporting said housing and insulating said housing from ground,
 (c) a primary conductor extending through said metal housing,
 (d) a pair of secondary windings mounted about said primary conductor and located adjacent each other along the length of said primary conductor, said secondary windings being electrically spaced from said primary conductor,
 (e) means for electrically connecting said primary conductor to said metal housing at one electrical side only of said secondary windings,
 (f) means electrically insulating said housing and said primary conductor from each other except for said connection at said one electrical side,
 (g) conductive shielding means disposed about the inner and outer peripheries of said secondary windings,
 (h) means for connecting said shielding means to ground,
 (i) and means for forcing any current flowing through said shielding means to ground to follow a path through said shielding means to ground that is located at said one electrical side of said current transformer secondary windings.

3. A circuit breaker assembly comprising:
 (a) a circuit interrupting unit having a conductive terminal through which current is carried to and from said interrupting unit,
 (b) a first housing at least partially of insulating material surrounding said circuit interrupting unit,
 (c) a metal housing located closely adjacent said first housing,
 (d) insulating means supporting said metal housing and insulating said metal housing from ground,
 (e) a primary conductor extending through said metal housing and connected to said terminal of said circuit interrupting unit,
 (f) a pair of secondary windings mounted about said primary conductor within said metal housing and located adjacent each other along the length of said primary conductor, said secondary windings being electrically spaced from said primary conductor,
 (g) means for electrically connecting said primary conductor to said metal housing at one electrical side only of said secondary windings, said one electrical side being opposite to the side at which said interrupting unit is connected to said primary conductor,
 (h) means for electrically insulating said metal housing and said primary conductor from each other except for said connection at said one electrical side,
 (i) conductive shielding comprising a first conductive tube interposed between said primary conductor and said secondary windings and electrically spaced from said primary conductor, a second conductive tube disposed about said secondary windings, and means electrically connecting said conductive tubes together at said one electrical side only of said secondary windings,
 (j) conductive means for providing a conductive path from said shielding to ground that is located at said one electrical side of said secondary windings,
 (k) and additional insulating means for forcing substantially all current flowing from such shielding to ground to follow said conductive path at said one electrical side of said secondary windings, said additional insulating means comprising means insulating said conductive tubes from each other except for said connection between the tubes at said one electrical side.

4. A circuit breaker assembly comprising:
 (a) a circuit interrupting unit having a conductive terminal through which current is carried to and from said interrupting unit,
 (b) a first housing at least partially of insulating material surrounding said circuit interrupting unit,
 (c) a metal housing located closely adjacent said first housing,
 (d) insulating means supporting said metal housing and insulating said metal housing from ground,
 (e) a primary conductor extending through said metal housing and connected to said terminal of said circuit interrupting unit,
 (f) a pair of secondary windings mounted about said primary conductor within said metal housing and located adjacent each other along the length of said primary conductor, said secondary windings being electrically spaced from said primary conductor, (g) means for electrically connecting said primary conductor to said metal housing at one electrical side only of said secondary windings, said one electrical side being opposite to the side at which said interrupting unit is connected to said primary conductor, (h) means for electrically insulating said metal housing and said primary conductor from each other except for said connection at said one electrical side, (i) conductive shielding means disposed about the inner and outer peripheries of said secondary windings, (j) means for connecting said shielding means to ground, (k) and means for forcing any current flowing through said shielding means to ground to follow a path through said shielding means to ground that is located at said one electrical side of said secondary windings.

5. The circuit breaker assembly of claim 3 in which:
(a) said metal housing has a hollow portion surrounding the portion of said primary conductor extending between said secondary windings and the terminal of said circuit interrupting unit,
(b) and means is provided for electrically insulating said hollow portion from said primary conductor except for said connection between said primary conductor and said metal housing at said one side of said secondary windings opposite to the location of the circuit interrupting unit.

6. The circuit breaker assembly of claim 3 in which means is provided for preventing a fault from occurring between points external to said metal housing and the portion of said primary circuit extending between said secondary windings and said circuit interrupting unit, said latter means comprising means for electrically connecting to said metal housing all metal structure in the vicinity of said primary circuit portion that is susceptible to faults to points external to said metal housing, and means for electrically insulating said metal structure from said primary circuit portion except for said connection between said housing and said primary conductor at said one side of the secondary windings opposite to the location of the circuit interrupting unit.

7. A circuit breaker assembly as set forth in claim 3 in which one of said secondary windings defines one of the boundaries of a protective zone located at one electrical side of said circuit breaker assembly and the other of said secondary windings defines one of the boundaries of a protective zone located at the other electrical side of said circuit breaker assembly.

8. A circuit breaker assembly comprising:
(a) a circuit interrupting unit having a conductive terminal through which current is carried to and from said interrupting unit,
(b) a first housing at least partially of insulating material surrounding said circuit interrupting unit,
(c) a metal housing located closely adjacent said first housing,
(d) hollow insulating means supporting said metal housing and insulating said metal housing from ground,
(e) a primary conductor extending through said metal housing and detachably connected to said terminal of said circuit interrupting unit,
(f) a secondary winding mounted about said primary conductor within said metal housing and electrically spaced from said primary conductor,
(g) means for electrically connecting said primary conductor to said metal housing at one electrical side only of said secondary winding, said one electrical side being opposite to the side at which said interrupting unit is connected to said primary conductor,
(h) means for electrically insulating said metal housing and said primary conductor from each other except for said connection at said one electrical side,
(i) conductive shielding disposed about the inner and outer peripheries of said secondary winding,
(j) and conductive structure at ground potential electrically connected to said conductive shielding and extending through said hollow insulating means and supporting said conductive shielding and said secondary windings.

9. The circuit breaker assembly of claim 8 in which:
(a) said secondary winding and said shielding are supported independently of said metal housing and said primary conductor,
(b) said metal housing has an opening therein large enough to permit said secondary winding and said shielding to pass therethrough during mounting and dismounting of said housing on said hollow insulating means, and
(c) said primary conductor is detachably connected to said housing and passes freely through said shielding in spaced relationship thereto.

10. A current transformer assembly comprising:
(a) a metal housing at high potential,
(b) insulating means supporting said housing and insulating said housing from ground,
(c) a primary conductor extending through said metal housing,
(d) a secondary winding mounted about said primary conductor and located within said metal housing in electrically-spaced relationship to said primary conductor,
(e) means for electrically connecting said primary conductor to said metal housing at one electrical side only of said secondary winding,
(f) means electrically insulating said housing and said primary conductor from each other except for said connection at said one electrical side,
(g) conductive shielding means disposed about the inner and outer peripheries of said secondary winding,
(h) means for connecting said shielding means to ground,
(i) and means for forcing any current flowing through said shielding means to ground to follow a path through said shielding means to ground that is located at said one electrical side of said current transformer secondary winding.

11. A circuit breaker assembly comprising:
(a) a circuit interrupting unit having a conductive terminal through which current is carried to and from said interrupting unit,
(b) a first housing at least partially of insulating material surrounding said circuit interrupting unit,
(c) a metal housing located closely adjacent said first housing,
(d) insulating means supporting said metal housing and insulating said metal housing from ground,
(e) a primary conductor extending through said metal housing and connected to said terminal of said circuit interrupting unit,
(f) a secondary winding mounted about said primary conductor within said metal housing and electrically-spaced from said primary conductor,
(g) means for electrically connecting said primary conductor to said metal housing at one electrical side only of said secondary windings, said one electrical side being opposite to the side at which said interrupting unit is connected to said primary conductor,
(h) means for electrically insulating said metal housing and said primary conductor from each other except for said connection at said one electrical side,
(i) conductive shielding means disposed about the inner and outer peripheries of said secondary winding,
(j) means for connecting said shielding means to ground,
(k) and means for forcing any current flowing through said shielding means to ground to follow a path through said shielding means to ground that is located at said one electrical side of said secondary winding.

12. The circuit breaker assembly of claim 11 in which:
(a) said metal housing has a hollow portion surrounding the portion of said primary conductor extending between said secondary winding and the terminal of said circuit interrupting unit,
(b) and means is provided for electrically insulating said hollow portion from said primary conductor except for said connection between said primary conductor and said metal housing at said one side of said secondary winding opposite to the location of the circuit interrupting unit.

References Cited by the Examiner

UNITED STATES PATENTS

| | | | |
|---|---|---|---|
| 2,504,647 | 4/1950 | Camilli | 324—157 X |
| 2,804,576 | 8/1957 | Coggeshall et al. | 317—27 X |
| 2,804,577 | 8/1957 | Roth | 317—14 X |
| 2,947,958 | 8/1960 | Marks | 317—15 X |
| 3,059,151 | 10/1962 | Marks | 317—15 |
| 3,105,172 | 9/1963 | Abel et al. | 317—15 |

SAMUEL BERNSTEIN, *Primary Examiner.*

R. V. LUPO, *Assistant Examiner.*